(12) United States Patent
Teyssier et al.

(10) Patent No.: US 8,352,794 B2
(45) Date of Patent: Jan. 8, 2013

(54) CONTROL OF CLOCK GATING

(75) Inventors: Remi Teyssier, Grasse (FR); Florent Begon, Antibes (FR); Jocelyn Francois Orion Jaubert, Antibes (FR); Cédric Denis Robert Airaud, Saint Laurent Du Var (FR)

(73) Assignee: ARM Limited, Cambridge (GB)

( * ) Notice: Subject to any disclaimer, the term of this patent is extended or adjusted under 35 U.S.C. 154(b) by 464 days.

(21) Appl. No.: 12/591,430

(22) Filed: Nov. 19, 2009

(65) Prior Publication Data
US 2010/0162063 A1 Jun. 24, 2010

(30) Foreign Application Priority Data

Dec. 19, 2008 (GB) .................................. 0823249.8

(51) Int. Cl.
*G06F 11/00* (2006.01)
(52) U.S. Cl. .......... 714/34; 714/735; 714/744; 714/731; 713/320; 713/321; 713/322; 713/400; 713/600; 713/601
(58) Field of Classification Search ........................ None
See application file for complete search history.

(56) References Cited

U.S. PATENT DOCUMENTS

| | | | | |
|---|---|---|---|---|
| 5,726,921 A * | 3/1998 | Krick | | 713/321 |
| 5,901,322 A * | 5/1999 | Herbst et al. | | 713/322 |
| 6,874,095 B2 * | 3/2005 | Usui | | 713/320 |
| 2003/0212917 A1 * | 11/2003 | Yoshitomi et al. | | 713/400 |
| 2006/0206737 A1 * | 9/2006 | Lee | | 713/320 |
| 2007/0006012 A1 * | 1/2007 | Mosur et al. | | 713/600 |

FOREIGN PATENT DOCUMENTS

EP  1 486 857  8/2005

OTHER PUBLICATIONS

Search Report for UK 0823249.8 dated Apr. 7, 2009.

* cited by examiner

*Primary Examiner* — John Trimmings
(74) *Attorney, Agent, or Firm* — Nixon & Vanderhye P.C.

(57) ABSTRACT

Clock signal control circuitry is disclosed along with a method for switching a clock between modes and a computer program product. The clock signal control circuitry is for receiving a clock signal from a clock signal generator and for outputting said clock signal to synchronous circuitry that is to be clocked by said clock signal. It comprises: an input for receiving mode switching signals indicating said synchronous circuitry is to switch between modes, said mode switching signals comprising a clock gating request signal indicating said synchronous circuitry is to enter a sleep mode during which said circuitry is not clocked and a wake up request signal indicating said synchronous circuitry is to enter an operational mode during which said circuitry is clocked; and is responsive to said clock gating request signal to gate said clock signal such that no clock signal is output to said synchronous circuitry and being responsive to said wake up request signal to output said clock signal to said synchronous circuitry. The clock signal control circuitry further comprises: a data store for storing a delay value; and delay circuitry for delaying switching of said clock signal between modes in response to at least one of said mode switching signals, said delay circuitry delaying said switching by an amount dependent upon said stored delay value.

21 Claims, 6 Drawing Sheets

CONTROL OF CLOCK GATING

This application claims priority to GB Application No. 0823249.8, filed Dec. 19, 2008, the entire contents of which are hereby incorporated by reference.

BACKGROUND OF THE INVENTION

1. Field of the Invention

The present invention relates to the field of clock gating control within synchronous circuitry.

2. Description of the Prior Art

Synchronous circuitry that is clocked by a clock signal may have that clock signal turned off or gated during non-operational periods or sleep modes to conserve power. Such power saving may involve gating the clock signal sent to a complete system when the system is not in use. Alternatively, the clock for just a part of the system, which we will refer to as a module, can be gated when that module is not operational. On an even finer basis, the clock can be gated for just a single element, for example a Flip Flop.

When gating on a module basis, the clock is usually gated early in the clock distribution tree of the module. Gating early in the clock distribution tree saves not only the power consumed by each Flip Flop within the module, but also the power consumed by the clock tree. In modern digital circuits, the consumption of the clock tree can account for up to a third of the power consumption of the complete circuit, so gating the clock tree can be an important way of reducing a system's power consumption.

The gating of a clock that clocks a module generally occurs in three phases. In a first phase, a signal is generated indicating that the clock should be gated, and this signal is sent to clock gating control circuitry. This signal can be generated either by the module itself, or by another module supervising the clock gating activity. In a second phase, the clock gating control circuitry responds to this signal by gating the clock going to the module. This gating is often performed high up in the distribution clock tree, to save as much power as possible in the clock tree itself. In a third phase, a "wake up" signal indicating that the clock should be re-enabled is generated, and this triggers the end of the clock gating phase. The cell gating the distribution of the clock is disabled in response to this signal, and the clock is again sent to the module. The wake up signal can be generated in different ways. In some systems, the module itself, on reception of a command, generates an asynchronous wake up signal to the clock gating control circuit. Alternatively, a clock gating supervisor module may generate a wake up signal when it determines that the module is required again. While in other systems, the wake up signal is generated by another module which interacts with the clock gated module, this module sends the wake up signal to the clock gating control circuit prior to interacting with the clock gated module.

In these systems account has to be taken of the relationship between the clock cycle of the clock signal and the time between the wake up signal being generated and the clock signal reaching the operational portion of the module. This time depends on multiple factors, including the logic that forms the clock gating control circuit and the depth of the clock tree between the clock gating cell and the module. In some cases, this time may be larger than the clock period, and this introduces a latency between the assertion of the wake up signal and the moment where the module is effectively woken up, i.e. the moment where the clock is really applied to the flip flops in the module.

For example, on systems such as those provided by ARM® of Cambridge England, running at 1 GHz the depth of the clock tree, between the gating cell commanded by the clock gating control circuit and the module itself may comprise many buffers and with the propagation delay for each buffer being 0.1 ns the propagation time can rise to a value that is greater than the length of a clock cycle. In such a system, for the clock gating method to be invisible, the clock gating control circuit must re-enable the clock at least one clock cycle before the module is going to be used.

This is important in systems that do not function correctly if the clock of the module does not switch at the expected time. This may be the case where there is no handshaking between the clock gated module and other modules interacting with it, or if the handshaking protocol does not take into account that the clock may be gated in the module. In such systems, the clock has to be switched on again early enough to avoid a failure of the system.

In other systems, while the handshaking protocol between the modules may allow for a late restart of the clock, the latency of the restart induces performance degradations which are to be avoided. Thus, in these circumstances too a restart of the clock is performed early enough for the clock gating activity to not have any impact on the overall performances of the system.

It is hence often desirable that the clock gating activity is invisible, or has limited impact on the complete system.

If the latency described previously in this application is more than a clock period, it means the wake up signal has to be asserted at least this amount of clock cycles earlier than the time where the module is meant to be operational for the gating to be invisible. The design of the clock gating mechanism has hence to take into account the ratio between the clock cycle and the latency of switching the clock on.

Conventionally therefore system have been built to assert the wake up signal a given number of clock cycles before the module is required to be operational. This number of clock cycle is a fixed number that takes into account the worst case, i.e. the worst predicted ratio between the latency and the clock cycle value.

One skilled in the art will understand that in some cases, this ratio may not be known firmly at the time the circuit is designed, i.e. at the time the clock gating circuitry is implemented.

For example, the circuit may operate at different frequency, either dynamically, when the frequency of the circuit is adapted to power constraints or to workload of the circuit, or statically, when a circuit is used in multiple different systems, having different operating frequency. The ratio will depend on the frequency of the clock, and if the worst case has to be taken into account, the ratio for when the circuit is operating at its highest frequency will be used to calculate the fixed number of clock cycles.

Other examples include fabrication process variation, where the clock delay may be worse on some chips than on other, forcing the clock gating policy to take into account the worst case, where the propagation delay is the highest.

In these examples, the fixed ratio taken into account, reflecting the worst cases, results in the clock being operational too early in the best cases, which means that the power saving produced by gating the clock is not as high as it could be. This problem is illustrated in FIG. 6.

Figure 6:
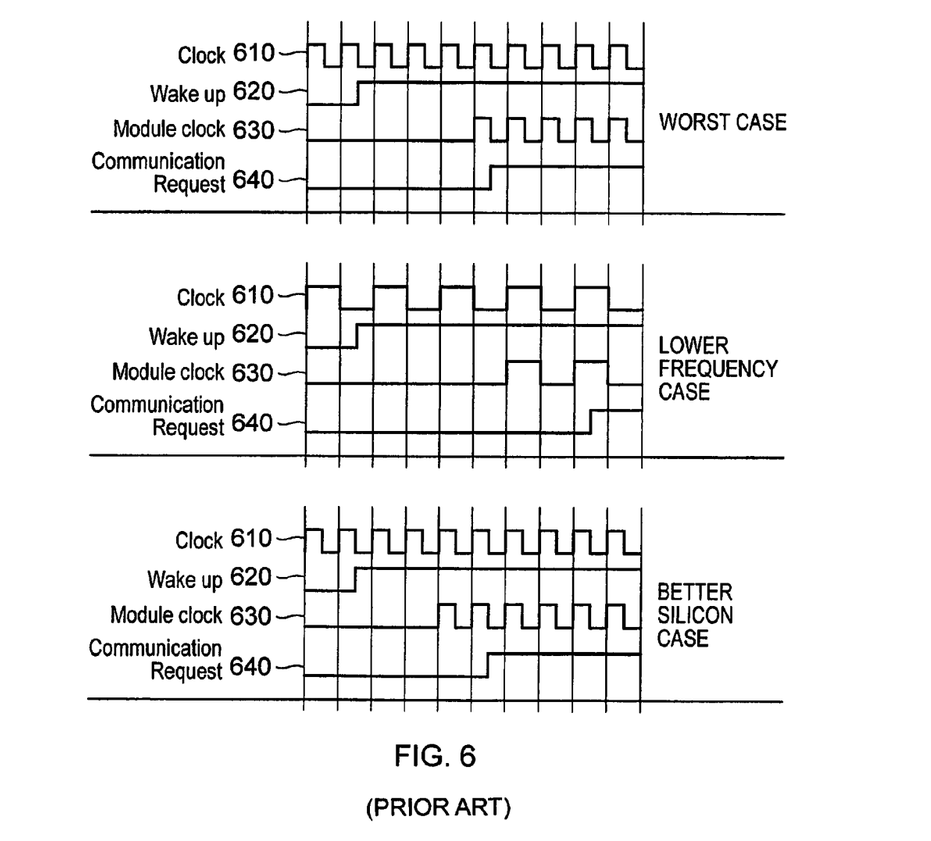
FIG. 6 shows a timing diagram of operation of circuits of the prior art.

FIG. 6 shows timing diagrams reflecting different operating cases of a same integrated circuit. The first "worst case" shows a wake up signal 620 being generated and the clock reaching the module just before the "communication request" 640 which is when the first signal that the module must process following its inactive mode reaches it. Thus, in this case the module sees its clock reasserted at the very first cycle before the clock is needed.

In the second case, the module is operating at a lower frequency. Here it can be seen that the first communication request reaches the module later due to the lower frequency operation and thus, the module is clocked for a clock cycle when it is not operational. This means that power is consumed during this clock cycle, mostly by the clock tree that propagates this clock cycle to the module, and yet this clock cycle is not requires so the power is in effect wasted power.

The third case is the "better silicon case" and this shows the same system working under certain circumstances where the electrical characteristics of the circuit allow for a better propagation time through the clock tree. This reflects an integrated circuit equivalent to the one described in the first two diagrams, except that its intrinsic quality allow for a better propagation delay of the clock through the clock tree. One skilled in the art will understand that such cases are frequent. On the same silicon wafer, two identical chips may have different characteristics implying different propagation delay through the same logical cells. Thus, in this case the propagation delay of the clock tree is smaller and the clock signal therefore reaches the module earlier than in the other cases. Thus, once again the module is clocked for a cycle before it is required to be operational and respond to the communication request.

It would be desirable to provide an improved power saving while still retaining a robust system in which clock gating is invisible.

SUMMARY OF THE INVENTION

Viewed from a first aspect, the present invention provides clock signal control circuitry for receiving a clock signal from a clock signal generator and for outputting said clock signal to synchronous circuitry that is to be clocked by said clock signal, said clock signal control circuitry comprising an input for receiving mode switching signals indicating said synchronous circuitry is to switch between modes, said mode switching signals comprising a clock gating request signal indicating said synchronous circuitry is to enter a sleep mode during which said synchronous circuitry is not clocked and a wake up request signal indicating said synchronous circuitry is to enter an operational mode during which said synchronous circuitry is clocked; said clock signal control circuitry being responsive to said clock gating request signal to gate said clock signal such that no clock signal is output to said synchronous circuitry and being responsive to said wake up request signal to output said clock signal to said synchronous circuitry; said clock signal control circuitry further comprising: a data store for storing a delay value; and delay circuitry for delaying switching of said clock signal between modes in response to at least one of said mode switching signals, said delay circuitry delaying said switching by an amount dependent upon said stored delay value.

One skilled in the art will understand that adjusting the stored delay value to the ratio between the clock cycle and clock propagation delay allows refining the clock gating policy, allowing a reduction of time where the clock is asserted when not needed.

The present invention recognises that in many conventional circuits, in order for the switching from sleep to operational mode to be invisible the switching signal is asserted early so that the mode switching occurs when expected, despite any delays that may be present in the system between the signal being asserted and the clock clocking the circuit. It also recognises that for safety the wake up switching signal is asserted early enough to account for the worst case propagation delays, and therefore in situations where the propagation time is better than expected or the clocking frequency is lower, the clock reaches the module before it is required resulting in unnecessary power consumption. The present invention addresses this problem by providing a storage means for storing a delay value, such that the sending of the clock signal to the clocked circuitry can be delayed by an amount dependent upon this value. Thus, by adjusting the value stored in the data store the system can be adapted to compensate for scenarios that are better than worst case, and therefore when it estimates that the system is working under better than worst case scenario it can delay the turning on of the clock by a certain number of cycles, such that the clock signal reaches the circuitry later and thus, power is saved.

In the case of the synchronous circuitry switching from operational to sleep mode, the system must be set up so that it does not switch off too early and thus, the assertion of the clock gating signal in conventional systems has been designed to be asserted before the system is meant to sleep by an amount that is based on the least time delay scenario, i.e. generally the lowest operational frequency and the best silicon case. In the case of a higher time delay or a higher operational frequency then the system is turned off later than required, again resulting in unnecessary power consumption. If however, a system is provided where a delay in switching is generated in dependence upon a value stored, then the clock gating signal can be asserted at a time that is appropriate for that circuit by providing a suitable delay by changing the value stored. Thus, the time between the generation of the clock gating signal and the system being turned off can be altered by adjusting the delay value so that the system turns off soon after it enters inactive mode.

Although the delay value can be stored in the data store in a number of ways, in some embodiments the clock signal control circuitry comprises external pins in communication with said data store, such that said delay value can be input to said data store via said external pins.

External pins can be used to input a delay value in a number of ways. For example, they can be used to set the delay value during testing of the circuit. In this way the performance of the circuit can be found and the delay value can be set accordingly. In other embodiments the external pins may be connected to external tying switches so that the delay value can be adjusted on an electronic board. This provides more flexibility allowing the value to be reset depending on circumstances.

In some embodiments said data store is configured to be write accessible to software, such that said delay value can be input by software.

Rather than using external pins it may be advantageous to use software that may, for example, have a program table that contains different delay values associated with different characteristics such as operating frequency, operating conditions or physical characteristics of the circuit. Thus, in response to detecting these characteristics the appropriate delay value can be sent from the software to the data store and stored there.

In other embodiments said clock signal control circuitry further comprises logic setting said delay value.

Logic can be used to set an appropriate delay value. This logic can be responsive to the various conditions such as operating frequency, operating conditions or physical characteristics of the circuit which may effect the optimal delay and can calculate an appropriate delay from these factors.

In some embodiments, said logic is responsive to at least one signal, said at least one signal comprising a signal indicating a propagation delay of a clock tree within said synchronous circuitry and a signal indicating an operating frequency of said synchronous circuitry.

As mentioned in the introduction the latency of the system depends on the propagation delay of the clock tree and the operating frequency. Therefore, it can be advantageous if the logic is responsive to signals indicating these two values to adjust the delay value as appropriate.

In particular, it may be appropriate for the delay value to be dependent upon a ratio of a propagation delay of said clock signal through a clock tree in said synchronous circuitry and a frequency of said clock signal.

The delay circuitry may be responsive to either the wakeup request indicating a switch to operational mode or the clock gating request signal indicating a switch to sleep mode to delay the response to this signal or it may be responsive to both.

In some embodiments said clock signal control circuitry comprises at least two data stores for storing at least two delay values, a wake up delay value and a sleep delay value, said delay circuitry being responsive to said wake up request signal to delay outputting said clock signal by an amount corresponding to said wakeup delay value and being responsive to said clock gating request signal to delay gating said clock signal by an amount corresponding to said sleep delay value.

If the delay circuitry is responsive to both the wakeup request signal and the clock gating request signal, i.e. it provides a delay on both switching to sleep mode and switching to operational mode then it may be appropriate to store two delay values, one delay value indicating the amount of delay to be provided in the case of waking up and the other indicating the delay to be provided when the system is to enter sleep mode. It should be noted that these two delay values are stored in two data stores, it would be clear to a skilled person that this could be just two storage elements within a single data store, a register file for example or it may be separate storage units.

In some embodiments, said clock signal control circuitry further comprises a counter, said delay circuitry delaying switching of said clock signal between modes in response to a signal from said counter.

One convenient way of instigating the delay is to use a counter. Counters are clocked units that take a certain amount of time to count a certain number of units. Thus, if a time delay is required a counter is a useful way of providing it.

In some embodiments, said delay value comprises a number of clock cycles of said clock signal by which said switching is to be delayed.

If the counter is clocked by the same clock signal that is clocking the synchronous circuit then it is convenient for the delay value to be the number of clock cycles of this clock signal. In this way simply counting either up to this value or decrementing from this value will provide the desired delay.

In other embodiments said counter is clocked by a clock signal that is different to said clock signal output by said clock signal generator.

A different clock can be used for clocking the counter. This may be appropriate where the delay required is easier to implement with a different frequency counter.

In some embodiments said clock signal control circuitry comprises a plurality of inputs for receiving a plurality of clock gating request signals and corresponding wake up request signals, a corresponding plurality of outputs for outputting a plurality of clock signals to a plurality of portions of said synchronous circuitry, each portion being independently controlled to switch between operational and sleep modes.

Some systems may have different modules that enter operational and sleep modes at different times. These will then each have their own clock gating request signals and wake up request signals.

In some embodiments, said clock signal control circuitry comprises at least two data stores for storing at least two delay values, said delay circuitry being responsive to different delay values for different portions of said circuitry.

If the synchronous circuitry has a plurality of modules, each of which enters operational and sleep modes in response to their own signals it may be that each of these modules have their own set of characteristics and their own clock frequency changes and thus, it may be appropriate for them to have their own delay values for delaying switching either from operational mode to sleep mode or from sleep mode to operational mode or both. Thus, in such circumstances it may be appropriate to have several delay values, the delay values being appropriate to the different modules and in some embodiments to the different mode switches.

A second aspect of the present invention provides a data processing apparatus comprising: a clock signal generator for generating a clock signal; synchronous circuitry clocked by said clock signal; at least one clock signal control circuitry according to a first aspect of the present invention, for receiving said clock signal from said clock signal generator and for outputting said clock signal to said synchronous circuitry during operational mode.

A third aspect of the present invention provides a method for delaying switching an output clock signal between modes, said clock signal being received from a clock signal generator and being output to a synchronous circuit, said modes comprising a sleep mode that is requested by a clock gating request signal and during which no clock signal is output, and an operational mode that is requested by a wake up request signal and during which a clock signal is output; said method comprising the steps of: receiving a request indicating a switch in modes; reading a delay value stored in a data store; delaying said switch in modes by an amount dependent upon said delay value.

A fourth aspect of the present invention provides a method for configuring an integrated circuit comprising clock signal delay circuitry according to a first aspect of the present invention, to set said delay value stored in said data store, said method comprising the steps of: determining a propagation delay between said synchronous circuitry receiving a mode switching signal and it switching a clock output signal to a different mode; setting said delay value in dependence upon said propagation delay in dependence upon said propagation delay.

A fifth aspect of the present invention provides a computer product comprising a computer program stored on a storage medium, said computer program controlling a computer to configure said data store within a clock gating control circuit to perform a method according to a fourth aspect of the invention.

In some embodiments, said computer is an integrated circuit tester.

It may be advantageous to be able to configure an integrated circuit such that appropriate delay values are stored. These may be stored in response to a knowledge of how this integrated circuit is to be used, or they may be set during testing of the integrated circuit, when its characteristics such as clock tree propagation delays can be determined.

A sixth aspect of the present invention provides a method of processing data on a processing apparatus according to a second aspect of the present invention, said method comprising the steps of: controlling a frequency of a clock signal sent from said clock generator to said synchronous circuitry; adjusting said delay value stored in said data store in dependence upon at least one of said frequency of said clock signal clocking said synchronous circuitry and characteristics of said data processing apparatus; sending mode switching signals to portions of said synchronous circuitry to switch said portions between operational modes where said circuitry is clocked and sleep modes where said circuitry is not clocked; delaying at least one of said switches in modes in dependence upon said stored delay value.

A seventh aspect of the present invention comprises a computer program product comprising a computer program stored on a storage medium, said computer program controlling a computer to perform a method as claimed in a sixth aspect of the present invention.

In some embodiments, said computer is said data processing apparatus and said data processing apparatus comprises an integrated circuit.

Some programs running on integrated circuits are in charge of controlling the operating frequency. This may be the case where the frequency of operation is different depending on whether the processor is powered by mains power or by a battery. The program may also be aware of the characteristics of the circuit. Thus, it may be able to set the delay values in response to its knowledge of these characteristics and/or operating conditions. In such a way the appropriate delay can be set dynamically during operation and the circuit can operate at a high power efficiency.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
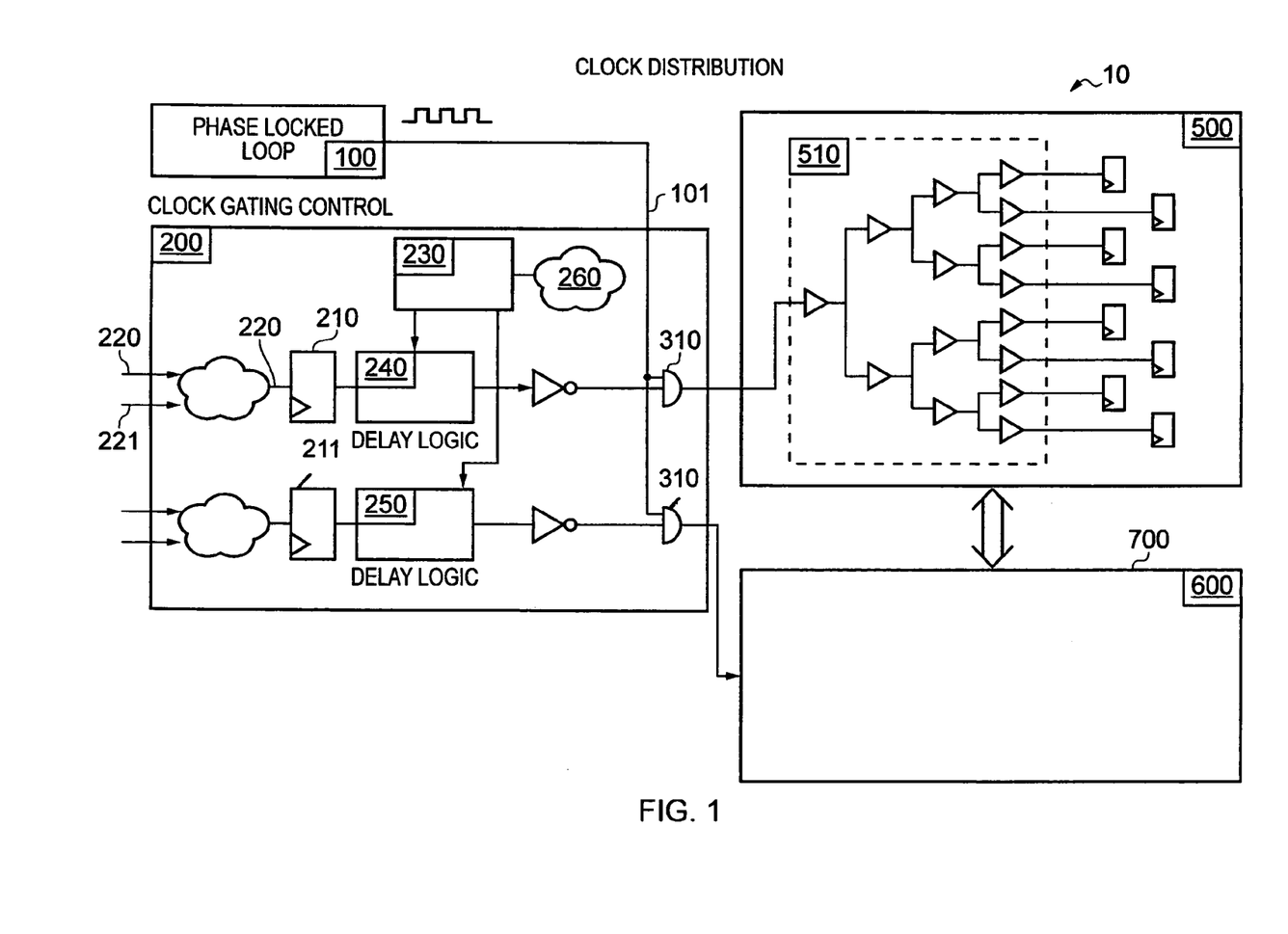
FIG. 1 schematically shows a system according to an embodiment of the present invention, comprising two modules of synchronous circuitry which interact with each other over a communication link and are independently gated.

FIG. 1 shows a data processing apparatus 10 comprising a clock generation circuit 100 in the form of a phase locked loop that generates a clock signal 101, clock gating control circuitry 200 which receives this clock signal and either forwards it to processing module 500 or processing module 600 or does not forward it, but rather gates the signal.

The two modules 500 and 600 use a communication link 700 to interact one with another. Their modes of operation (either inactive, sleep mode, or active operational mode) are separately controlled and thus, their clock signals are sent or gated independently of each other by clock gating control circuit 200. Module 500 is shown as comprising a clock distribution tree 510 for distributing the clock signal to the synchronous circuitry within the module. A similar tree (not shown) is present in module 600.

The clock signal 101 is generated under the control of the Phase Locked Loop (PLL) 100. One skilled in the art will know that other modules than a PLL can be used to generate the clock signal 101.

The gating or otherwise of the clock signal is controlled by clock gating control circuitry 200 which comprises two D-type flip flops (DFF) 210 and 211. DFF 210 is used to control the clock gating cell 310 to gate the clock distributed to module 500, while DFF 211 is used to control the clock gating cell 310 to gate the clock distributed to module 600.

When module 500 is to become inactive a clock gating request signal 220 is asserted to indicate that this module should enter sleep mode. This signal is used within the clock gating control circuit 200 to activate the clock gating control flip flop 210. If the clock gating policy accepts clock gating activity, the flip flop 210 is set to 1, reflecting that the clock to module 500 is to be gated. This signal is then sent via delay logic 240 to clock gating cell 310, where it gates the clock signal.

Delay logic 240 delays the output of clock gating signal 220 to clock gating cell 310 by an amount that is dependent on the value stored in data store 230.

Similar delay logic 250 is present to delay the clock gating signal sent to module 600. Data stores 230 is used to control the amount of time by which delay logic 240 and 250 will delay the switching between sleep mode and operational mode of respectively module 500 and module 600.

The gating signal gates module 500 before the clock tree 510, which buffers the clock before distributing it to flip flops within module 500. The gating of the clock 101 before the clock tree 510 allows power saving by avoiding toggling activity within this clock tree.

When module 600 is meant to communicate with module 500 through communication link 700, wake up signal 221 is asserted to the clock gating control circuit 200. Upon reception of this signal, the clock gating control circuit 200 resets the flip flop 210, which output will remove the forced gating on clock 101 through clock gating cell 310.

Once the clock is propagated to module 500, communication between module 500 and module 600 can start.

If there is a delay value stored in data store 230 for delaying the wake up, then delay logic 240 will delay the wake request by an amount that is dependent upon this value. It should be noted that in some embodiments the wake up requests to either or both modules are delayed, while in others the clock gating requests are delayed, while in still others both are delayed. The amount of the delay is dependent on values stored in data store 230. There may be a value that delays the wake up of both modules 500 and 600 by the same amount, or there may be two values stored so that they are each delayed by different amounts, the amount of the delay depending on the different characteristics of the modules and their frequency of operation.

In this embodiment logic 260 stores a table of different delay values for delaying the mode request signals of the different modules depending on various characteristics of the system such as current operating voltage and operating frequency. Logic 260 is responsive to detecting changes in these to change the values stored in data store 230, such that the delay provided to the mode switching signals changes with changing characteristics of the circuits.

Figure 2:
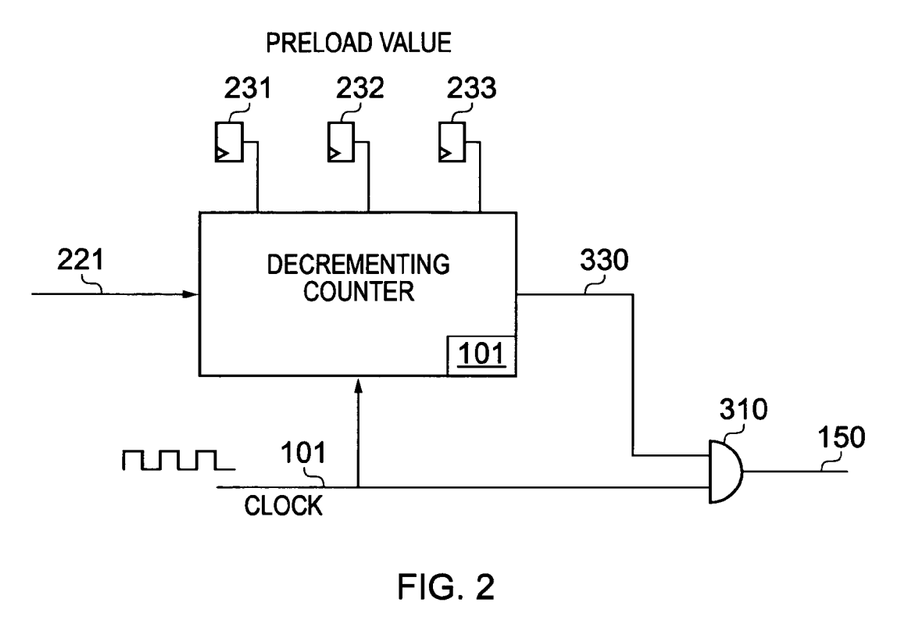
FIG. 2 shows an embodiment of the present invention where a counter is used as a means to delay the switching between modes.

FIG. 2 schematically shows one embodiment of delay logic 240 and 250. In this embodiment wake up request signal 221 is used to trigger counting down operated by decrementing counter 101, starting from a preloaded value held in flip flops 231, 232 and 233. This value has been loaded from data store 230. When counter 101 reaches value 0, signal "done" 330 is asserted, this signal being used to control the gating cell 310 used to gate the clock 101 to produce gated clock 150. The assertion of signal "Done" 330 un-gates the clock, which is then sent to the module.

The counting down from a preloaded value allows the un-gating of the clock to be delayed by a given number of cycles, equal to the value preloaded into flip flops 231 to 233. So while the assertion of the wake up signal 221 has been designed to compensate for the worst case, embodiments of the present invention allow this to be adjusted by using the counter to delay the un-gating of the clock.

One skilled in the art will understand that when in a system where there is frequent switching between active and inactive modes, adjusting the timing where the clock is gated or not offers a tuning of the power consumption, allowing for longer battery life or lower overall power consumption of the electronic system.

Though FIG. 2 details a system where the clock 120 used by the counter is the same clock that is gated before distribution to the module, it will be clear to a skilled person that a different clock with a different frequency could be used where appropriate. Clearly the preload value stored would depend on the frequency of the clock used.

Figure 3:
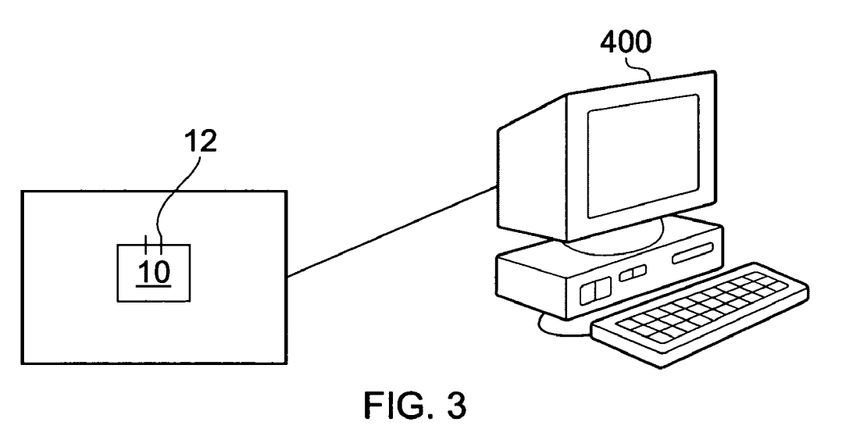
FIG. 3 schematically shows an integrated circuit tester for testing characteristics of integrated circuits and setting said delay value.

FIG. 3 schematically shows a testing device 400 for testing an integrated circuit 10. Integrated circuit 10 has clock gating control circuitry according to an embodiment of the present invention within it. This includes a data store (not shown) for storing delay values for delaying the switching between modes of the clock signal sent to the synchronous circuitry. The integrated circuit 10 has external pins 12 that provide access to this data store, and during testing when the characteristics of the integrated circuit 10 have been deduced, these pins are used to set an appropriate delay value into the data store.

Figure 4:
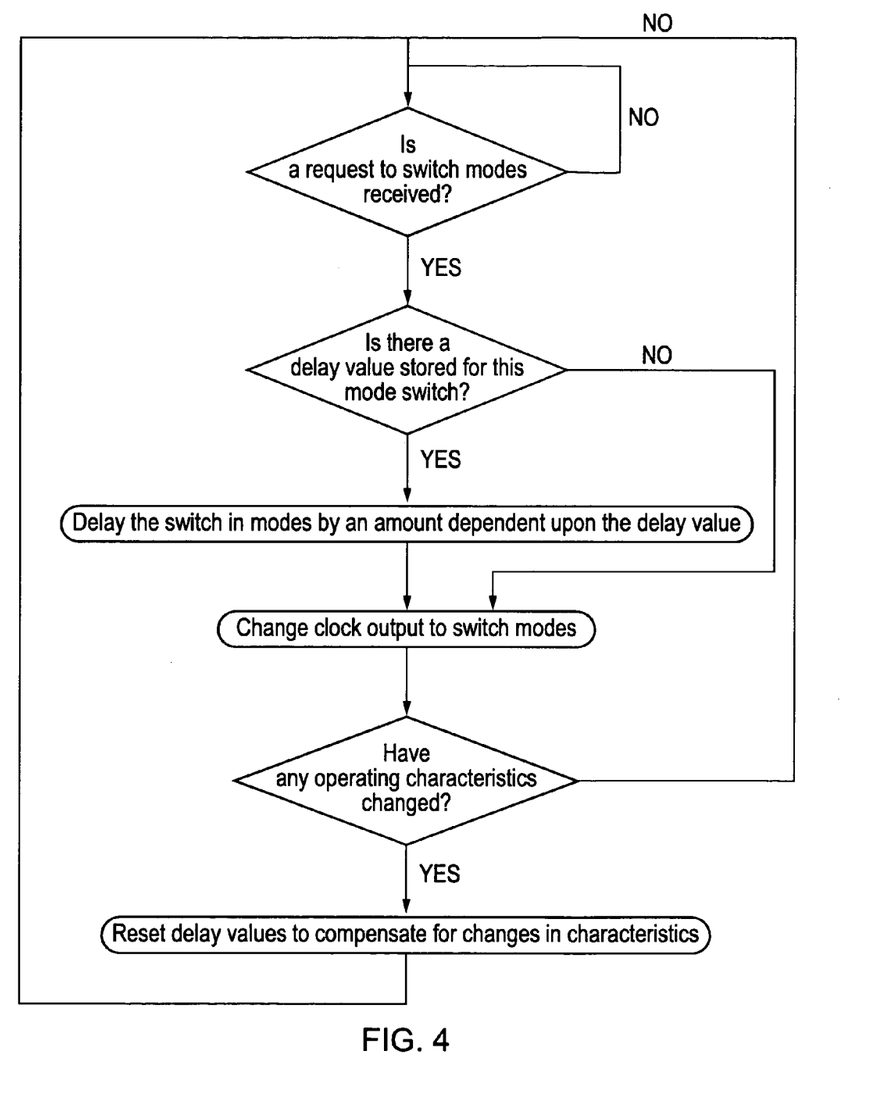
FIG. 4 shows a flow diagram illustrating a method of delaying switching between modes according to an embodiment of the present invention.

FIG. 4 shows a flow diagram illustrating a method of delaying switching between modes according to an embodiment of the present invention. In this method a request is received to switch modes. If there is a delay value stored for this mode switch, then the switch in modes is delayed by an amount dependent upon this delay value and the clock output is then changed to provide the switch in modes. If there is no value stored for delaying this particular mode switch then the clock output is changed immediately in response to the mode switch request.

The system is also responsive to detecting changes in operating characteristics that will affect delays in the system. If it detects such changes then the relevant delay values are changed so that the mode switch continues to occur in the clocked circuitry at an appropriate time and the number of cycles where this circuitry is clocked but not needed are reduced.

Figure 5:
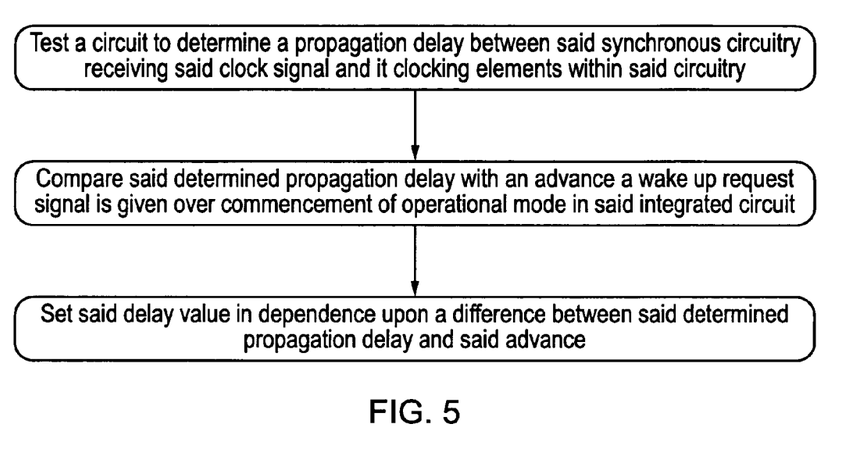
FIG. 5 shows a flow diagram illustrating a method of configuring the clock signal delay circuitry.

FIG. 5 shows a flow diagram illustrating a method of configuring the clock signal delay circuitry for a wake up request. In this method the circuit is tested to determine propagation delays between the synchronous circuitry receiving the clock signal and it clocking elements within the circuitry. These delays are important in determining when the wake up request signal should be sent. Each propagation delay is compared with an advance the wake up request signal has been given in this circuit over commencement of operational mode. If the advance is larger than the propagation delay then a delay value is set to compensate for this. In this way the clock signal does not reach the circuit it is clocking too long before it is needed.

Although FIG. 5 shows testing for propagation delays, the circuit can be tested for other characteristics that will affect delays and a table of values might be stored. The delay values can then be set from the table depending on operating conditions.

Similarly, although FIG. 5 shows testing for wake up of a circuit, it will be clear to a skilled person that a delay value can also be set that is appropriate for the clock gating signal. Once again propagation delays and other characteristics will affect this value.

Various further aspects and features of the present invention are defined in the appended claims. Various modifications can be made to the embodiments herein before described without departing from the scope of the present invention.

For example, different mechanism could be used to program the required delay to be adjusted depending on the propagation delay of the clock. For example, at test time, the tester could quantify the propagation delay and program it inside the chip, in a flash area for example. Propagation delay analysis logic could also be used to populate a table to be adjusted depending on the frequency.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Clock signal control circuitry for receiving a clock signal from a clock signal generator and for outputting said clock signal to synchronous circuitry that is to be clocked by said clock signal, said clock signal control circuitry comprising:
   an input for receiving mode switching signals indicating said synchronous circuitry is to switch between modes, said mode switching signals comprising a clock gating request signal indicating said synchronous circuitry is to enter a sleep mode during which said circuitry is not clocked and a wake up request signal indicating said synchronous circuitry is to enter an operational mode during which said circuitry is clocked;
   said clock signal control circuitry being responsive to said clock gating request signal to gate said clock signal such that no clock signal is output to said synchronous circuitry and being responsive to said wake up request signal to output said clock signal to said synchronous circuitry;
   said clock signal control circuitry further comprising:
   a data store for storing a delay value; and
   delay circuitry for delaying switching of said clock signal between modes in response to at least one of said mode switching signals, said delay circuitry delaying said switching by an amount dependent upon said stored delay value, wherein said delay value is dependent upon a ratio of a propagation delay of said clock signal through a clock tree in said synchronous circuitry and a frequency of said clock signal.

2. The clock signal control circuitry according to claim 1, said clock signal control circuitry further comprising external pins in communication with said data store, such that said delay value can be input to said data store via said externals pins.

3. The clock signal control circuitry according to claim 1, wherein said data store is configured to be write accessible to software, such that said delay value can be input by software.

4. The clock signal control circuitry according to claim 1, said clock signal control circuitry further comprising logic for setting said delay value.

5. The clock signal control circuitry according to claim 4, wherein said logic is responsive to at least one signal, said at least one signal comprising a signal indicating a propagation delay of a clock tree within said synchronous circuitry and a signal indicating an operating frequency of said synchronous circuitry.

6. The clock signal control circuitry according to claim 1, wherein said delay circuitry is responsive to said wake up request signal to delay said switching.

7. The clock signal control circuitry according to claim 1, said clock signal control circuitry comprising at least two data stores for storing at least two delay values, a wake up delay value and a sleep delay value, said delay circuitry being responsive to said wake up request signal to delay outputting said clock signal by an amount corresponding to said wakeup delay value and being responsive to said sleep clock gating request signal to delay gating said clock signal by an amount corresponding to said sleep delay value.

8. The clock signal control circuitry according to claim 1, further comprising a counter, said delay circuitry delaying switching of said clock signal between modes in response to a signal from said counter.

9. The clock signal control circuitry according to claim 8, wherein said counter is clocked by a clock signal that is different to said clock signal output by said clock signal generator.

10. The clock signal control circuitry according to claim 1, wherein said delay value comprises a number of clock cycles of said clock signal by which said switching is to be delayed.

11. The clock signal control circuitry according to claim 10 further comprising a counter, said delay circuitry delaying switching of said clock signal between modes in response to a signal from said counter, and wherein said delay circuitry delays said switching of said clock signal between modes by a time taken for said counter to count a value equal to said delay value.

12. Clock signal control circuitry for receiving a clock signal from a clock signal generator and for outputting said clock signal to synchronous circuitry that is to be clocked by said clock signal, said clock signal control circuitry comprising:
an input for receiving mode switching signals indicating said synchronous circuitry is to switch between modes, said mode switching signals comprising a clock gating request signal indicating said synchronous circuitry is to enter a sleep mode during which said circuitry is not clocked and a wake up request signal indicating said synchronous circuitry is to enter an operational mode during which said circuitry is clocked;
said clock signal control circuitry being responsive to said clock gating request signal to gate said clock signal such that no clock signal is output to said synchronous circuitry and being responsive to said wake up request signal to output said clock signal to said synchronous circuitry;
said clock signal control circuitry further comprising:
a data store for storing a delay value; and
delay circuitry for delaying switching of said clock signal between modes in response to at least one of said mode switching signals, said delay circuitry delaying said switching by an amount dependent upon said stored delay value, said clock signal control circuitry comprising a plurality of inputs for receiving a plurality of clock gating request signals and corresponding wake up request signals, a corresponding plurality of outputs for outputting a plurality of clock signals to a plurality of portions of said synchronous circuitry, each portion being independently controlled to switch between operational and sleep modes.

13. The clock signal control circuitry according to claim 12, said clock signal control circuitry comprising at least two data stores for storing at least two delay values, said delay circuitry being responsive to different delay values for different portions of said circuitry.

14. A data processing apparatus comprising:
a clock signal generator for generating a clock signal;
synchronous circuitry clocked by said clock signal;
at least one clock signal control circuitry according to claim 1, for receiving said clock signal from said clock signal generator and for outputting said clock signal to said synchronous circuitry during operational mode.

15. A method for delaying switching an output clock signal between modes, said clock signal being received from a clock signal generator and being output to a synchronous circuit, said modes comprising a sleep mode that is requested by a clock gating request signal and during which no clock signal is output, and an operational mode that is requested by a wake up request signal and during which a clock signal is output;
said method comprising the steps of:
receiving a request indicating a switch in modes;
reading a delay value stored in a data store;
delaying said switch in modes by an amount dependent upon said delay value, wherein said delay value is dependent upon a ratio of a propagation delay of said clock signal through a clock tree in said synchronous circuit and a frequency of said clock signal.

16. A method for configuring an integrated circuit comprising clock signal delay circuitry according to claim 1, to set said delay value stored in said data store, said method comprising the steps of:
determining a propagation delay between said synchronous circuitry receiving a mode switching signal and it switching a clock output signal to a different mode;
setting said delay value in dependence upon said propagation delay in dependence upon said propagation delay.

17. A computer program product comprising a computer program stored on a storage medium, said computer program controlling a computer to configure said data store within a clock gating control circuit to perform a method as claimed in claim 16.

18. The computer program product as claimed in claim 17, wherein said computer is an integrated circuit tester.

19. A method of processing data on a data processing apparatus according to claim 14, said method comprising the steps of:
controlling a frequency of a clock signal sent from said clock generator to said synchronous circuitry;
adjusting said delay value stored in said data store in dependence upon at least one of said frequency of said clock signal clocking said synchronous circuitry and characteristics of said data processing apparatus;
sending mode switching signals to portions of said synchronous circuitry to switch said portions between operational modes where said circuitry is clocked and sleep modes where said circuitry is not clocked;
delaying at least one of said switches in modes in dependence upon said stored delay value.

20. A computer program product comprising a computer program stored on a storage medium, said computer program controlling a computer to perform a method as claimed in claim 19.

21. The computer program product as claimed in claim 20, wherein said computer is said data processing apparatus and said data processing apparatus comprises an integrated circuit.

* * * * *